(12) United States Patent
de Jong

(10) Patent No.: US 7,010,783 B2
(45) Date of Patent: Mar. 7, 2006

(54) METHOD AND APPARATUS FOR DEPLOYMENT OF HIGH INTEGRITY SOFTWARE USING REDUCED DYNAMIC MEMORY ALLOCATION

(75) Inventor: Eduard de Jong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 533 days.

(21) Appl. No.: 10/101,289

(22) Filed: Mar. 18, 2002

(65) Prior Publication Data

US 2003/0177472 A1    Sep. 18, 2003

(51) Int. Cl.
G06F 9/44 (2006.01)
(52) U.S. Cl. ..................................... 717/131
(58) Field of Classification Search ............... 717/110, 717/127, 131–133, 151–161; 714/38; 711/4, 711/100, 170–173
See application file for complete search history.

(56) References Cited

U.S. PATENT DOCUMENTS

| | | | |
|---|---|---|---|
| 4,734,568 A | 3/1988 | Watanabe | |
| 5,107,418 A | 4/1992 | Cramer et al. | 395/700 |
| 5,384,749 A | 1/1995 | Lisart et al. | |
| 5,423,027 A | 6/1995 | Jackson | 395/575 |
| 5,615,137 A | 3/1997 | Holzmann et al. | 364/578 |
| 5,650,948 A | 7/1997 | Gafter | 364/578 |
| 5,659,754 A | 8/1997 | Grove et al. | 395/709 |
| 5,668,999 A | 9/1997 | Gosling | 395/704 |
| 5,740,441 A | 4/1998 | Yellin et al. | 395/704 |
| 5,748,964 A | 5/1998 | Gosling | 395/705 |
| 5,790,859 A | 8/1998 | Sarkar | 395/704 |
| 5,802,519 A | 9/1998 | de Jong | 707/100 |
| 5,836,014 A | 11/1998 | Faiman, Jr. | 395/707 |
| 5,887,161 A | 3/1999 | Cheong et al. | |
| 5,968,169 A | 10/1999 | Pickett | 712/239 |
| 5,974,255 A | 10/1999 | Gossain et al. | |
| 6,038,397 A | 3/2000 | Iwanishi et al. | |
| 6,052,690 A | 4/2000 | de Jong | 707/101 |
| 6,094,656 A | 7/2000 | De Jong | 707/100 |
| 6,282,700 B1 | 8/2001 | Grover et al. | |
| 6,292,874 B1 | 9/2001 | Barnett | |
| 6,349,344 B1 | 2/2002 | Sauntry et al. | |
| 6,463,581 B1 | 10/2002 | Bacon et al. | |
| 6,526,571 B1 | 2/2003 | Aizikowitz et al. | |
| 6,604,190 B1 | 8/2003 | Tran | 712/207 |
| 6,684,261 B1 | 1/2004 | Orton et al. | 719/328 |

(Continued)

FOREIGN PATENT DOCUMENTS

EP    0 390 339    10/1990

(Continued)

OTHER PUBLICATIONS

Pieter H. Hartel, "Formalizing the Safety of Java, the Java Virtual Machine, and Java Card", ACM, Dec. 2001.*

(Continued)

*Primary Examiner*—Wei Y. Zhen
(74) *Attorney, Agent, or Firm*—Gunnison, McKay & Hodgson, L.L.P.

(57) ABSTRACT

A method for reducing dynamic memory allocation includes designing a software program using a memory allocation module for allocating memory, analyzing the software program to determine a bound on dynamic memory allocation and modifying the program based on the analyzing. According to one aspect, the program is modified to use static memory allocation in lieu of dynamic memory allocation based on the analyzing. According to another aspect, the program is modified to reduce the amount of dynamically allocated memory based on the analyzing.

61 Claims, 13 Drawing Sheets

U.S. PATENT DOCUMENTS

| | | | |
|---|---|---|---|
| 6,718,485 B1 * | 4/2004 | Reiser | 714/38 |
| 6,735,758 B1 | 5/2004 | Berry et al. | 717/130 |
| 2002/0019969 A1 * | 2/2002 | Hellestrand et al. | 716/5 |
| 2002/0097269 A1 * | 7/2002 | Batcha et al. | 345/762 |
| 2002/0147903 A1 | 10/2002 | Hubert et al. | 713/1 |
| 2003/0097581 A1 | 5/2003 | Zimmer | 713/200 |
| 2004/0015920 A1 | 1/2004 | Schmidt | 717/153 |
| 2004/0103416 A1 | 5/2004 | Orton et al. | 719/328 |

FOREIGN PATENT DOCUMENTS

| | | |
|---|---|---|
| EP | 0 543 588 | 5/1993 |
| EP | 0 605 872 A1 | 7/1994 |
| EP | 0 751 458 A1 | 1/1997 |
| EP | 0 821 305 A2 | 1/1998 |
| EP | 1 056 002 | 11/2000 |
| FR | 2 806 813 | 3/2000 |
| WO | 94/24673 | 10/1994 |
| WO | 98/19237 | 5/1998 |
| WO | 99/24944 | 5/1999 |

OTHER PUBLICATIONS

Allen, et al., "A Program Data Flow Analysis Procedure", Mar. 76', Comm. of the ACM, vol. 19, No. pp. 137-147.

Back, G. et al., "Java Operating Systems", Design and Implementation, Technical Report UUCS-98-015, Online!, Aug. 6, 1998, Dept. of Computer Science, Univ. of Utah, US (located at http://www,cs-tr.cornell.edu:80/Dienst/UI/1.0/Display/ncstrl.utahcs/UUCS098-015).

Dreifus, H., Smart Cards; A Guide to Building and Managing Smart Card Applications; Copyright 1998; Publisher Robert Ipsen' "Smart Card Development Skills, Methods, and Tools"; pp. 159-176;224-225.

Hecht, et al., "A Simple Algorithm for Global Data Flow Analysis Problems", Dec. 1975, SIAM Journal of Computing, vol. 4, No. 4, pp. 519-532.

Heiss, J. et al., "Java Card™ Technology Grows Up Smart", printed on Apr. 22, 2000 at http://java.sum.com/features/1990/01/javacard.html, 5 pages.

Helaihel, et al., "Java as a Specification Language for Hardware-Software Systems", IEEE 1997 (0-89791-993), pp 8.

Kennedy, K., "A Global Flow Analysis Algorithm", 71', Intl. Journal of Comp. Math Sect. A., vol. 3, pp. 5-15.

Thomas David, J., "Smart and Smarter: The Emergence of Java Card™ Technology", printed on Apr. 22, 2000 from http://java/sun.com/features/1998/04/javacard.html, pp 1-8.

Sun Microsystems, Inc., "Java TM Card TM Runtime Environment (JCRE) 2.1 Specification-Draft 2", printed Dec. 4, 1998m YS XO002138793 cited in the application p. 6-2 p. 6-10.

Sun Microsystems, Inc., "Smart Cards: A primer", printed on Apr. 22, 2000 from http://www.javaworld.com/javaworld/jw-12-19_b97/f_jw-12-javadev_p.html, pp 1-13.

Sun Microsystems, Inc., "Java Card™ 2.1 Runtime Environment (JCRE) Specification", Jun. 7, 1999, Final Revision 1.1.

Aho, et al., Code Optimization, Mar. 1988, Compilers-Principles, Techniques, and Tools, Addison-Wesley Publishing Co., Chapter 10, pp. 585-722.

Chan, "Infrastructure of Multi-Application Smart Card", http://home.hkstar.com/~alanchan/papers/multiApplicationSmartCard/, Jul. 25, 2002.

Chen, Zhiqun, "Java Card™ Technology for Smart Cards", *Sun Microsystems*, pp. 11- Jun. 16, 2000.

Philips Semiconductor, "Designers offered first 16-bit smart card IC architecture with development tools", Press Release, Jul 25, 2002.

Ritchey, Tim, "Advanced Topics: The Java Virtual Machine", *Java!*, Chapter 14, pp. 25-346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

"*Memory Corruption Debugging System*", IBM Technical Disclosure Bulletin, IBM COrp., N.Y., Jan. 1, 1995, XP000498811, vol. 38, No. 1, pp. 395-400.

"*Pseudo-Dynamic Algorithm for Computer Memory Allocation*", IBM Technical Disclosure Bulletin, IBM Corp., N.Y., Sep. 1, 1993, vol. 36, No. 9A, XP000396177, pp. 597-599.

A. Johan Cockx, "*Whole Program Comilation for Embedded Software: The ADSL Experiment*", Apr. 25-27, 2001, pp. 214-218.

International Search Report, PCT/FR 03/08508, International filing date Mar. 17, 2003.

International Search Report, PCT/FR 03/08506, International filing date Mar. 17, 2003, Search Report mailed Mar. 17, 2004.

Qian et al., "A Formal Specification of Java™ Class Loading", *CiteSeer*, pp. 1-47, Jul. 2000.

Cap et al., "Extending the data storage capabilities of a Java-based smartcard", *IEEE*, pp 680-685, Jul. 2001.

Togethersoft Corporation, "Together Documentation Set: Together Getting Started Guide version 4.2", *Online Manual*, p. 26, line 1-4, [Online] 2000. (XP002292559).

Attali, I. et al., "Smart Tools for Java Cards", *Fourth Working Conference on Smart Card Research and Advanced Applications Bristol UK*, pp. 155-174, [Online] Sep. 20, 2000. (XP002292560).

Martin, H. et al., "Automatic Test Generation for Java-Card Applets", *Java on Smart Cards Programming and Security, Cannes, France*, pp. 121-136, [Online] Sep. 14, 2000. (XP002292561).

Aho, A. et al., "Compilers Principles, Techniques, and Tools", Addison-Wesley Publishing Co, US, pp. 1-646, 1986. (XP002941830).

Vendicator, "Stack Shield Technical Info File v0.7", paragraph 5, [Online] Jan. 7, 2000. (XP002292774).

Chiueh, T. et al., "RAD: A Compile-Time Solution to Buffer Overflow Attacks", *IEEE 21st International Conference on Distributed Computing Systems*, Phoenix, AZ, USA, pp. 409-417, [Online] Apr. 16, 2001. (XP002292775).

Baentsch, M. et al., "Javacard- From Hype to Reality", *IEEE Concurrency*, vol. 7, No. 4, IEEE Service Center, Piscataway, NY, US, pp. 36-43, Oct. 1999. (XP000873322).

Dean, Jeffrey, "ProfileMe: Hardware Support for Instruction-Level Profiling on Out-of-Order Processors", *IEEE* 1072-451/97.

Dolby, Julian, "Automatic Inline Allocation of Objects", Concurrent Systems Architecture Group, Department of Computer Science, University of Illinois.

Zhao, Jianjun "Applying Program Dependence Analysis to Java Software" Fukuoka Kogyo Daigaku Kenkyu Ronshu (Research Bulletin for Fukuoka Institute of Technology), vol. 31, No. 1, pp. 29-41 1998.

\* cited by examiner

METHOD AND APPARATUS FOR DEPLOYMENT OF HIGH INTEGRITY SOFTWARE USING REDUCED DYNAMIC MEMORY ALLOCATION

CROSS REFERENCE TO RELATED APPLICATIONS

This application is related to the following:

U.S. patent application Ser. No. 10/101,296 filed Mar. 18, 2002 in the name of Eduard de Jong, entitled "Method and Apparatus for Deployment of High Integrity Software Using Initialization Order and Calling Order Constraints", commonly assigned herewith.

U.S. patent application Ser. No. 10/100,838, filed Mar. 18, 2002 in the name of Eduard de Jong and Pieter Hartel, entitled "Method and Apparatus for Deployment of High Integrity Software Using Static Procedure Return Addresses", commonly assigned herewith.

FIELD OF THE INVENTION

The present invention relates to the field of computer science. More particularly, the present invention relates to a method and apparatus for deployment of high integrity software using reduced dynamic memory allocation.

BACKGROUND OF THE INVENTION

High integrity software is software that must be trusted to work dependably in some critical function, and whose failure to do so may have catastrophic results, such as serious injury, loss of life or property, business failure or breach of security. Some examples include software used in safety systems of nuclear power plants, medical devices, electronic banking, air traffic control, automated manufacturing, and military systems. The importance of high quality, low defect software is apparent in such critical situations. However, high integrity software is also important in more mundane business areas where defective software is often the norm.

Formal verification is the process of checking whether a design satisfies some requirements or properties. In order to formally verify a design, it must first be converted into a more condensed, verifiable format. The design is specified as a set of interacting systems, each having a finite number of configurations or states. States and transition between states constitute finite state machines (FSMs). The entire system is a FSM that can be obtained by composing the FSMs associated with each component. The first step in verification consists of obtaining a complete FSM description of the system. Given a present state (or current configuration), the next state (or successive configuration) of a FSM can be written as a function of its present state and inputs (transition function or transition relation). Formal verification attempts to execute every possible computational path with every possible state value to prove every possible state is consistent.

A software program executing on a computer typically uses three types of memory: program memory, stack memory and heap memory. Program instructions are typically stored in program memory. Parameters, return values and variables local to procedures are typically stored in stack memory. Heap memory is typically used for dynamic memory requests made during program execution. Heap memory typically comprises a portion of the computer's random access memory (RAM). Whether static or dynamic memory allocation is used in the compiled code depends on the programming construct used by the programmer.

Turning now to FIG. 1, a flow diagram that illustrates a typical method for writing, compiling and executing a software program that dynamically allocates memory during program execution is presented. At 100, a software program that includes dynamic memory allocation is written. At 105, the software program is compiled. At 110, the software program is executed, dynamically allocating memory at run-time.

Unfortunately, dynamic allocation of memory during runtime is relatively inefficient. Runtime allocation of memory typically requires a relatively large number of processor cycles. Also, each access of the dynamically allocated memory typically requires more processor cycles than accessing a statically allocated variable because loading a dynamically allocated variable includes resolving indirect memory references. Loading a dynamically allocated variable requires loading a pointer value that contains the address of the dynamically allocated variable and then using the pointer value as an address to load the variable data.

Program verification is also complicated by dynamic memory allocation due to the many factors that can affect the size of a dynamic memory allocation. Dynamic memory allocation makes the state of a module dependent upon a runtime component that performs memory allocation. Coupling the state of the memory allocation to the state of the module that uses it complicates the state engine that is verified. This problem is especially acute for developers of programs targeted to devices having relatively tight memory constraints.

A programmer may perform static allocation of memory by hand. However, this process is particularly error-prone, typically resulting in low quality, low integrity software.

Accordingly, what is needed is a solution that increases program verifiability. A further need exists for such a solution that reduces dynamic memory allocation. Yet a further need exists for such a solution that simplifies memory management. Yet a further need exists for such a solution that automates memory management for programs targeted to devices having relatively limited memory.

SUMMARY OF THE INVENTION

A method for reducing dynamic memory allocation includes designing a software program using a memory allocation module for allocating memory, analyzing the software program to determine a bound on dynamic memory allocation and modifying the program based on the analyzing. According to one aspect, the program is modified to use static memory allocation in lieu of dynamic memory allocation based on the analyzing. According to another aspect, the program is modified to reduce the amount of dynamically allocated memory based on the analyzing.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
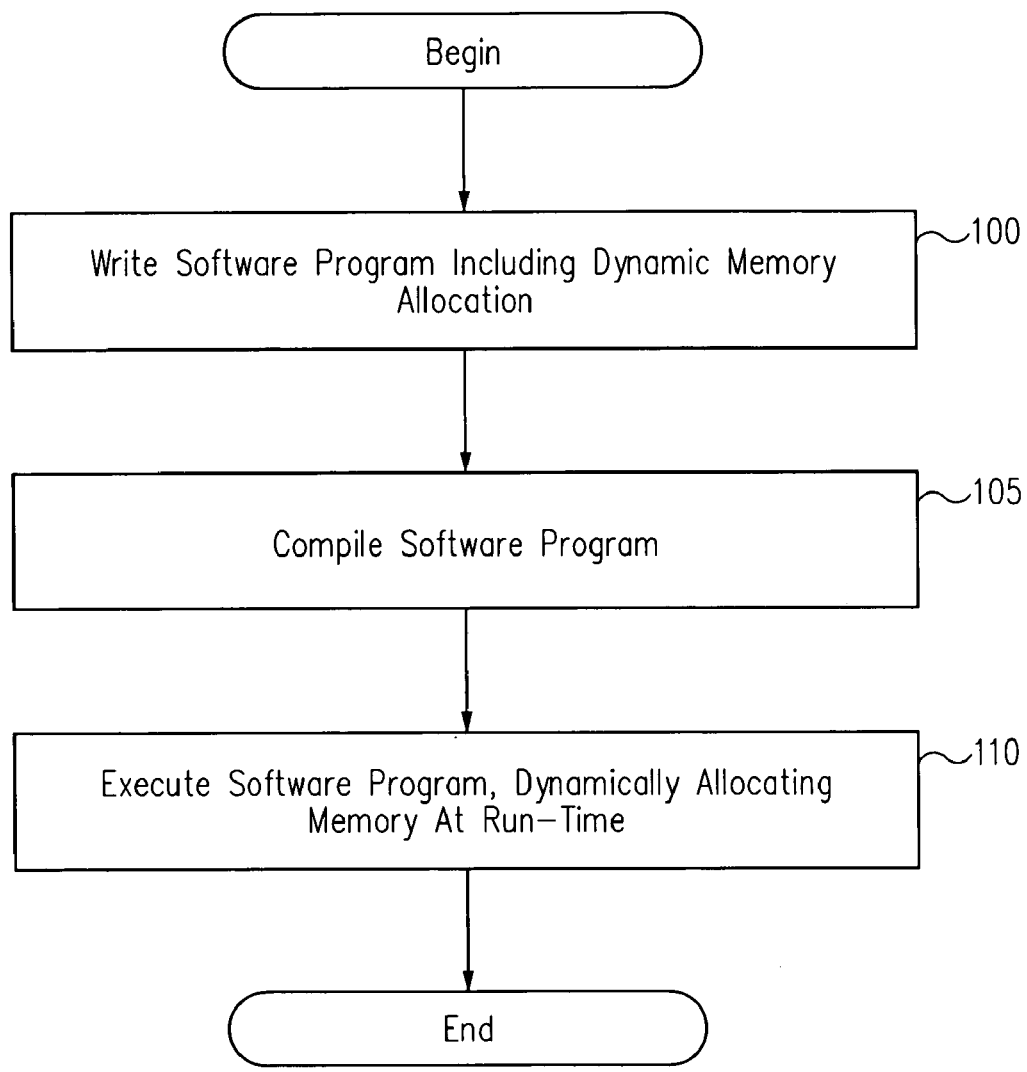
FIG. 1 is a flow diagram that illustrates a typical method for writing, compiling and executing a software program that dynamically allocates memory during program execution.

Embodiments of the present invention are described herein in the context of a method and apparatus for deployment of high integrity software using reduced dynamic memory allocation. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Palo Alto, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

According to embodiments of the present invention, a software program is analyzed to determine bounds on dynamic memory allocation. The software program is then modified to replace the bounded dynamic memory allocation with static memory allocation.

Figure 2:
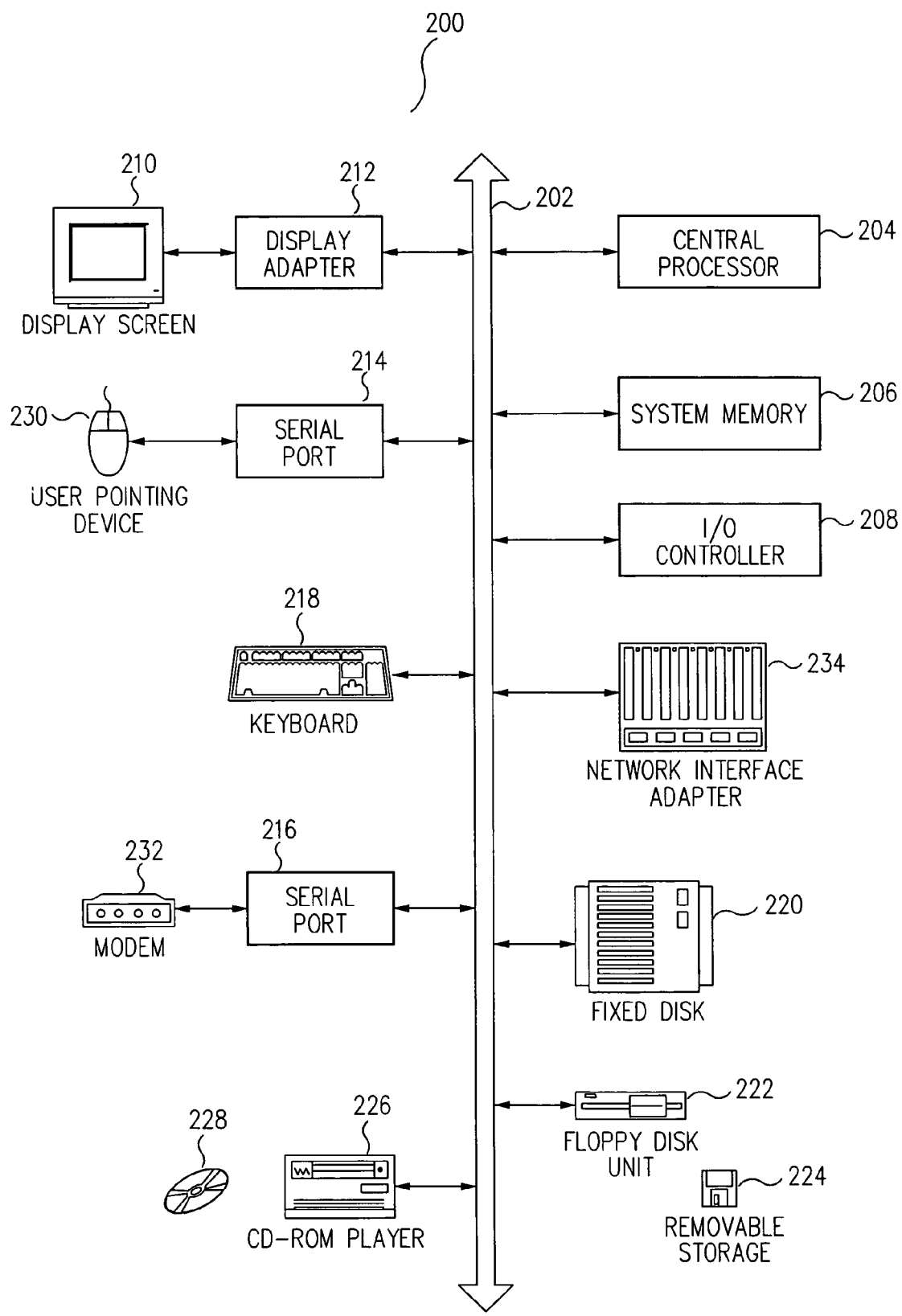
FIG. 2 is a block diagram of a computer system suitable for implementing aspects of the present invention.

FIG. 2 depicts a block diagram of a computer system 200 suitable for implementing aspects of the present invention. As shown in FIG. 2, computer system 200 includes a bus 202 which interconnects major subsystems such as a central processor 204, a system memory 206 (typically RAM), an input/output (I/O) controller 208, an external device such as a display screen 210 via display adapter 212, serial ports 214 and 216, a keyboard 218, a fixed disk drive 220, a floppy disk drive 222 operative to receive a floppy disk 224, and a CD-ROM player 226 operative to receive a CD-ROM 228. Many other devices can be connected, such as a pointing device 230 (e.g., a mouse) connected via serial port 214 and a modem 232 connected via serial port 216. Modem 232 may provide a direct connection to a remote server via a telephone link or to the Internet via a POP (point of presence). Alternatively, a network interface adapter 234 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 206 or stored on storage media such as fixed disk 220, floppy disk 224 or CD-ROM 228.

For purposes of the present disclosure, a program specification refers to a model of a program design, expressed in terms of a strictly formalized language that is directly amenable to analysis using formal mathematical logic. A program specification may include one or more module specification that indicates other modules callable by the module. A program implementation refers to a software program written using a particular programming language.

Figure 3:
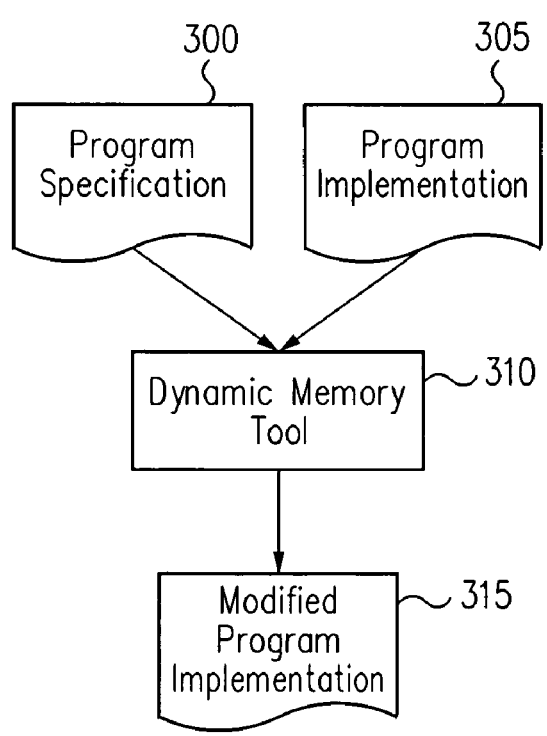
FIG. 3 is a block diagram that illustrates using a dynamic memory tool to produce a program implementation having reduced dynamic memory usage in accordance with one embodiment of the present invention.

Turning now to FIG. 3, a block diagram that illustrates using a dynamic memory tool to produce a program implementation having reduced dynamic memory usage in accordance with one embodiment of the present invention is presented. A dynamic memory tool 310 receives a program implementation 305. The dynamic memory tool 310 analyzes the program implementation 305 to determine bounds on dynamic memory allocation. The program implementation 305 is modified to replace bounded dynamic memory allocations with static memory allocations.

Figure 4:
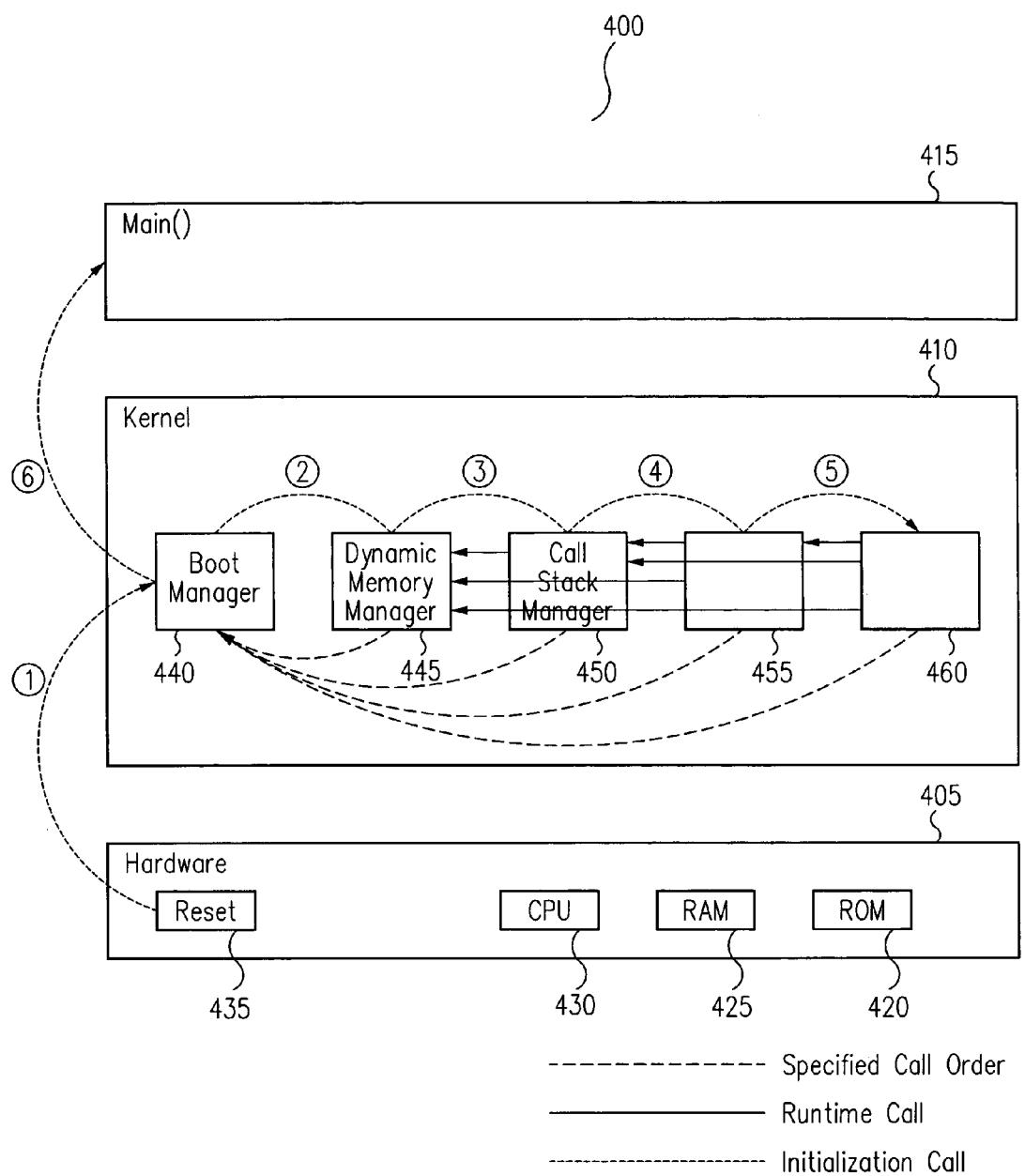
FIG. 4 is a block diagram that illustrates an apparatus for deployment of high integrity software using reduced dynamic memory allocation in accordance with one embodiment of the present invention.

Turning now to FIG. 4, a block diagram that illustrates an apparatus for deployment of high integrity software using reduced dynamic memory allocation in accordance with one embodiment of the present invention is presented. FIG. 4 includes a hardware component 405, a kernel component 410 and a main procedure component 415. Hardware component 405 includes a read-only memory (ROM) 420, a random access memory (RAM) 425, a reset indicator 435 and a central processing unit (CPU) 430.

Kernel component 410 includes executable code modules that include one or more procedures. Modules (440–460) include an initialization procedure to initialize the module (440–460). The initialization procedure must be called before other procedures within the module (440–460) are called. When apparatus 400 is reset, reset indicator 435 sends a signal to boot manager 440. Boot manager 440 calls the initialization procedure of at least one module (440–460) in a predetermined order. As shown in the example illustrated by FIG. 4, the initialization procedure for boot manager 440 is called first, followed by the initialization procedures for dynamic memory manager 445, call stack manager 450, module 455 and module 460.

Calling order constraints in system 400 correspond to the initialization order constraints. A calling module may call any module that occurs before the calling module in the initialization sequence. A special case exists for embodiments where the boot manager module 440 is an actual module rather than a placeholder. If the boot manager module 440 is an actual module, it is limited to calling the initialization procedure for any module (440–460). In the example illustrated by FIG. 4, module 460 may call modules 455, 450, 445 or 440. Module 455 may call modules 450, 445 or 440. Module 450 may call modules 445 or boot manager module 440. Module 445 may call boot manager module 440. Boot manager module 440 is limited to calling the initialization procedure for any of modules 445, 450, 455 or 460.

Still referring to FIG. 4, both call stack manager 450 and memory manager 445 are placeholders or formalizations of program elements. Memory manager 445 manages dynamic memory allocation requests from other modules. The dynamic memory allocation requests are analyzed to determine bounds on the allocations. The software program is rewritten using a dynamic memory tool to replace dynamic memory allocation requests with static memory allocations.

The call stack manager 450 allocates space for static, pre-allocated return addresses. The call stack manager 450 allocates the space by making a procedure call to the memory manager 445, including the memory allocation request. Since the call stack manager 450 must call or use the services of the memory manager 445, the call stack manager 450 is placed after the memory manager in the initialization sequence. Placing the call stack manager 450 formally early in the initialization sequence guarantees memory allocation for the static return addresses. It also guarantees static allocation of a memory area for a call stack. The call allows the memory manager 445 to reserve space for the static return addresses in its formal model of memory. The logic of the call stack manager is a call stack tool, which may rewrite modules to use static locations to store procedure return addresses, as disclosed in copending U.S. patent application Ser. No. 10/100,838, filed Mar. 18, 2002 in the name of Eduard de Jong and Pieter Hartel, entitled "Method and Apparatus for Deployment of High Integrity Software Using Static Procedure Return Addresses".

Figure 5:
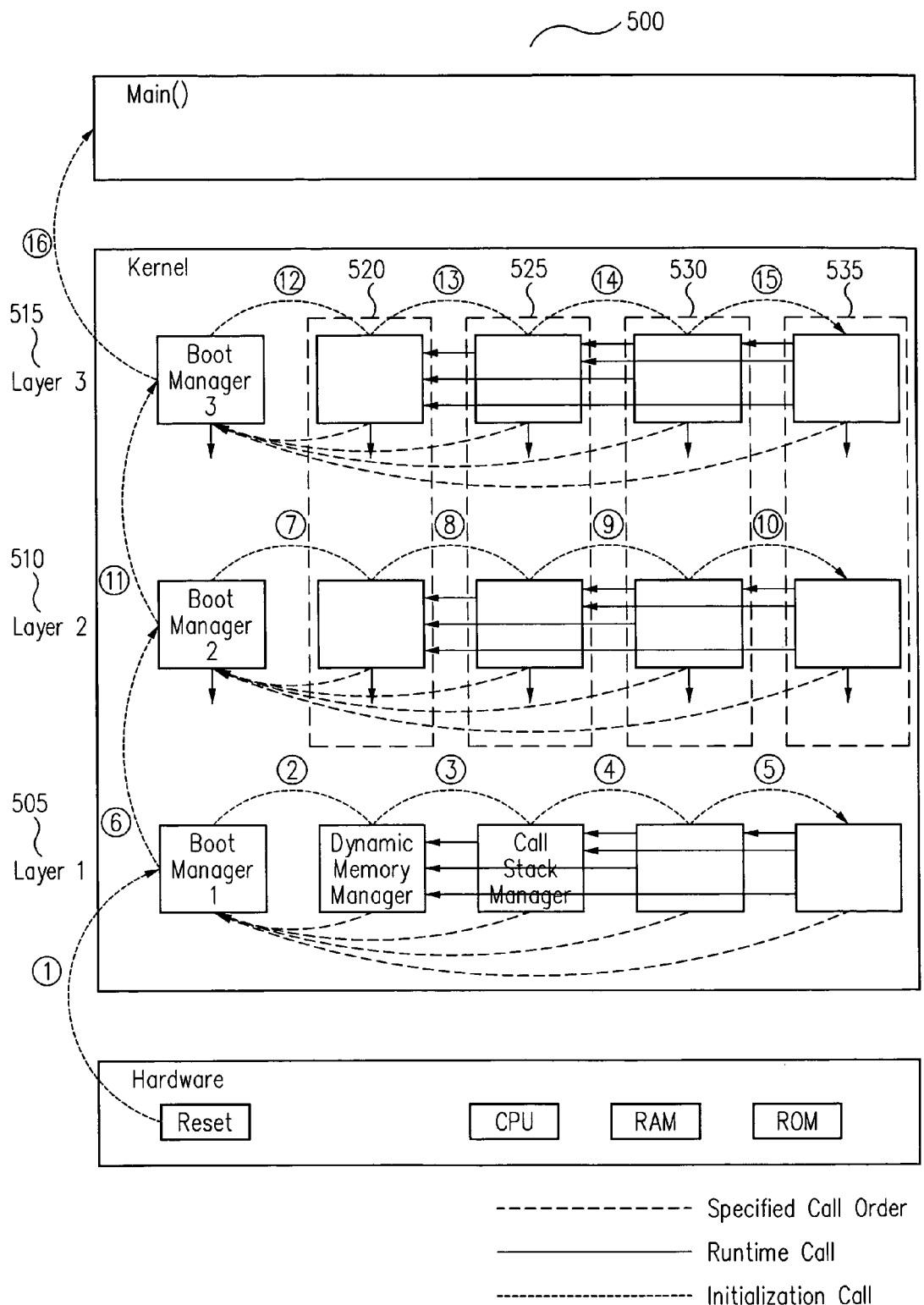
FIG. 5 is a block diagram that illustrates an apparatus for deployment of high integrity software using reduced dynamic memory allocation in a layered software design in accordance with one embodiment of the present invention.

Turning now to FIG. 5, a block diagram that illustrates an apparatus for deployment of high integrity software using reduced dynamic memory allocation in a layered software design in accordance with one embodiment of the present invention is presented. FIG. 5 is similar to FIG. 4, except that FIG. 5 includes multiple module layers. Layer 1 (505) includes modules that have relatively unrestricted functionality and are at a relatively low level of abstraction. Layer 3 (515) includes modules that have relatively restricted functionality and are at a relatively high level of abstraction.

According to one embodiment of the present invention, the number of layers is three. According to another embodiment of the present invention, the number of layers is four. Those of ordinary skill in the art will recognize a different number of layers is possible within the inventive concepts disclosed herein.

System 500 may be further organized into columns of related functionality. Four columns of related functionality (520, 525, 530, 535) are shown in FIG. 5. In an exemplary arrangement, a layer 3 (515) module is an "Input/Output Manager" module that handles many types of high level input and output. A corresponding layer 2 (510) module is a "Buffer Input/Output" module that handles page-oriented input and output. A corresponding layer 1 (505) module is a "Byte Input/Output" module that handles low-level byte input and output. Those of ordinary skill in the art will recognize that many other groupings are possible.

FIGS. 4 and 5 are for purposes of illustration and are not intended to be limiting in any way. Those of ordinary skill in the art will recognize that embodiments of the present invention may employ other software architectures.

Figure 6:
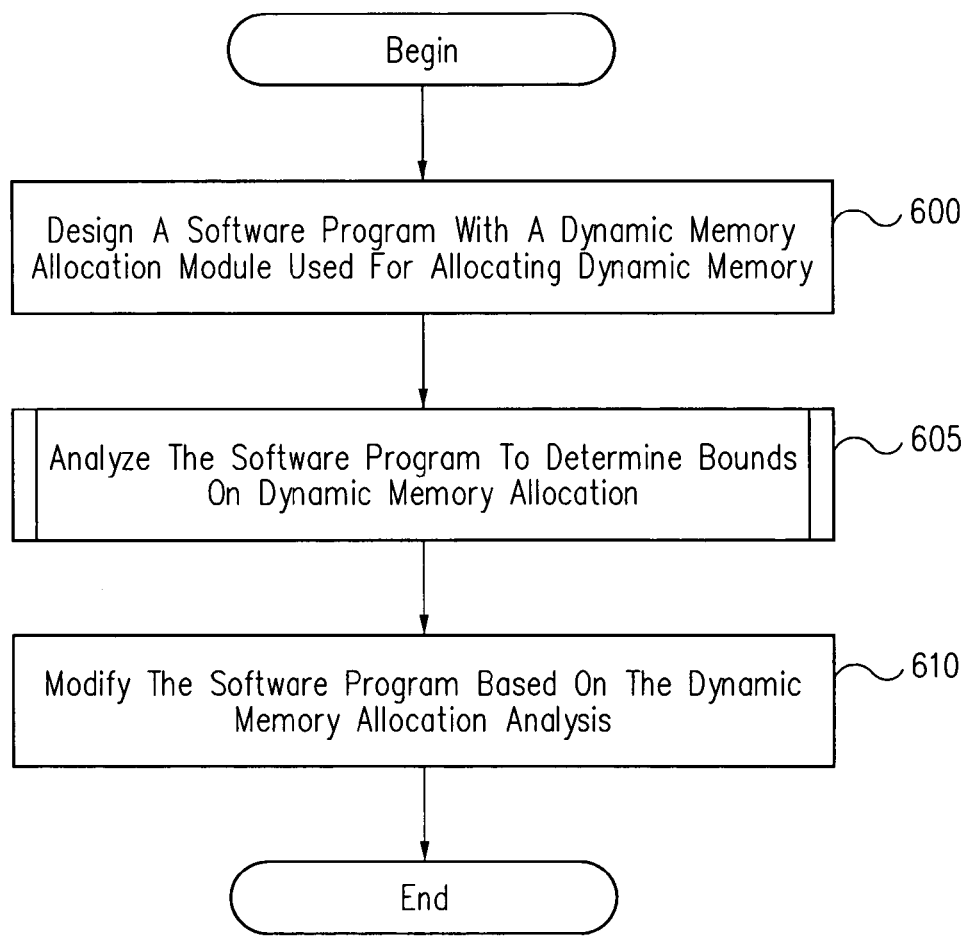
FIG. 6 is a flow diagram that illustrates a method for deployment of high integrity software using reduced dynamic memory allocation in accordance with one embodiment of the present invention.

Turning now to FIG. 6, a flow diagram that illustrates a method for deployment of high integrity software using reduced dynamic memory allocation in accordance with one embodiment of the present invention is presented. At 600, a software program is designed using a dynamic memory allocation module for allocating memory. All dynamic memory allocation requests comprise a request presented to the dynamic memory allocation module.

In the C and $C^{++}$ languages, memory is dynamically allocated using the "malloc" instruction. According to one embodiment of the present invention, a C compiler generates code that forwards "malloc" calls to the dynamic memory allocation module. According to another embodiment of the present invention, a $C^{++}$ compiler generates code that forwards "malloc" calls to the dynamic memory allocation module described herein.

In Java™ technology, memory is dynamically allocated using the "new" instruction. According to one embodiment of the present invention, a Java™ compiler generates code that forwards "new" calls to the dynamic memory allocation module described herein. The Java™ programming language is described in detail in Gosling et al., "The Java™ Language Specification", August 1996, Addison-Wesley Longman, Inc.

The above illustrations with respect to the "malloc" and "new" instructions are not intended to be limiting in any way. Those of ordinary skill in the art will recognize that the invention may be applied to other compilers and their corresponding dynamic memory allocation instructions.

Still referring to FIG. 6, once the initial design of a program is complete, at 605 the software program is analyzed to determine bounds on dynamic memory allocation. Initialization procedures are the first procedures to execute when a system is booted. Consequently, the initialization procedures must be independent of the state of other procedures in the same module. The analysis of initialization procedures therefore uses bounds on variables that are known before run-time to determine bounds on dynamic memory allocation. Analysis of other procedures uses bounds determined from data flow and control flow analysis of the program, in addition to any bounds set by a specification associated with an implementation. This is described in more detail below with respect to FIG. 7. Once the bounds on dynamic memory allocation have been determined, at 610 the software program is modified based upon the dynamic memory allocation analysis.

According to one embodiment of the present invention, modification of the software program includes changing code that performs a dynamic memory allocation to code that performs a static memory allocation. The modification also includes changing code that referred to a dynamically allocated variable to refer to a statically allocated variable. For example, suppose a procedure includes a dynamic allocation and that the upper bound for the allocation is an input parameter for the procedure. If the data flow and control flow analysis determines an upper bound and there is no bound found in the specification, the software program is modified to use the upper bound determined from the data flow and control flow analysis. If the specification includes a bound, the software program is modified to use the upper bound obtained from the specification.

According to one embodiment of the present invention, the dynamic memory allocation module is removed from the program if the modification results in a program with no dynamic memory allocation.

According to another embodiment of the present invention, a dynamic memory allocation request is rewritten to request only the amount of memory required based on the bounds analysis. Thus, a request for a relatively large amount of dynamically allocated memory is replaced with a request for a relatively small amount of dynamically allocated memory.

According to another embodiment of the present invention, the "size" parameter of a dynamic memory allocation request is rewritten to refer to an index into a table of preallocated memory block addresses. The operation of the memory management routine (such as the "new" routine in a Java™ program or the "malloc" routine in C or C++ program) is also changed to use the input parameter as an index into the table instead of the amount of memory requested. The size of the memory block pointed to is based on the bounds analysis.

According to another embodiment of the present invention, a dynamic memory allocation request is rewritten to refer to the address of a pre-allocated memory block. By way of example, the C or C++ statement "a=malloc (100)" could be rewritten as "a=xABCD", where "xABCD" is the address of a pre-allocated memory block having a size that is based on the bounds analysis.

Still referring to FIG. 5, both call stack manager 550 and memory manager 545 are placeholders or formalizations of program elements. Memory manager 545 manages dynamic memory allocation requests from other modules. The dynamic memory allocation requests are analyzed to determine bounds on the allocations. The software program may be rewritten using a dynamic memory tool to replace dynamic memory allocation requests with static memory allocations as disclosed in copending U.S. patent application Ser. No. 10/101,289, filed Mar. 18, 2002 in the name of Eduard de Jong, entitled "Method and Apparatus for Deployment of High Integrity Software Using Reduced Dynamic Memory Allocation".

The call stack manager 550 allocates space for static, pre-allocated return addresses. The call stack manager 550 allocates the space by making a procedure call to the memory manager 545, including the memory allocation request. Since the call stack manager 550 must call or use the services of the memory manager 545, the call stack manager 550 is placed after the memory manager in the initialization sequence. Placing the call stack manager 550 formally early in the initialization sequence guarantees memory allocation for the static return addresses. It also guarantees static allocation of a memory area for a call stack. The call allows the memory manager 545 to reserve space for the static return addresses in its formal model of memory. The logic of the call stack manager is a call stack tool, which may rewrite modules to use static locations to store procedure return addresses, as disclosed in copending U.S. patent application Ser. No. 10/100,838, filed Mar. 18, 2002 in the name of Eduard de Jong and Pieter Hartel, entitled "Method and Apparatus for Deployment of High Integrity Software Using Static Procedure Return Addresses".

Figure 7:
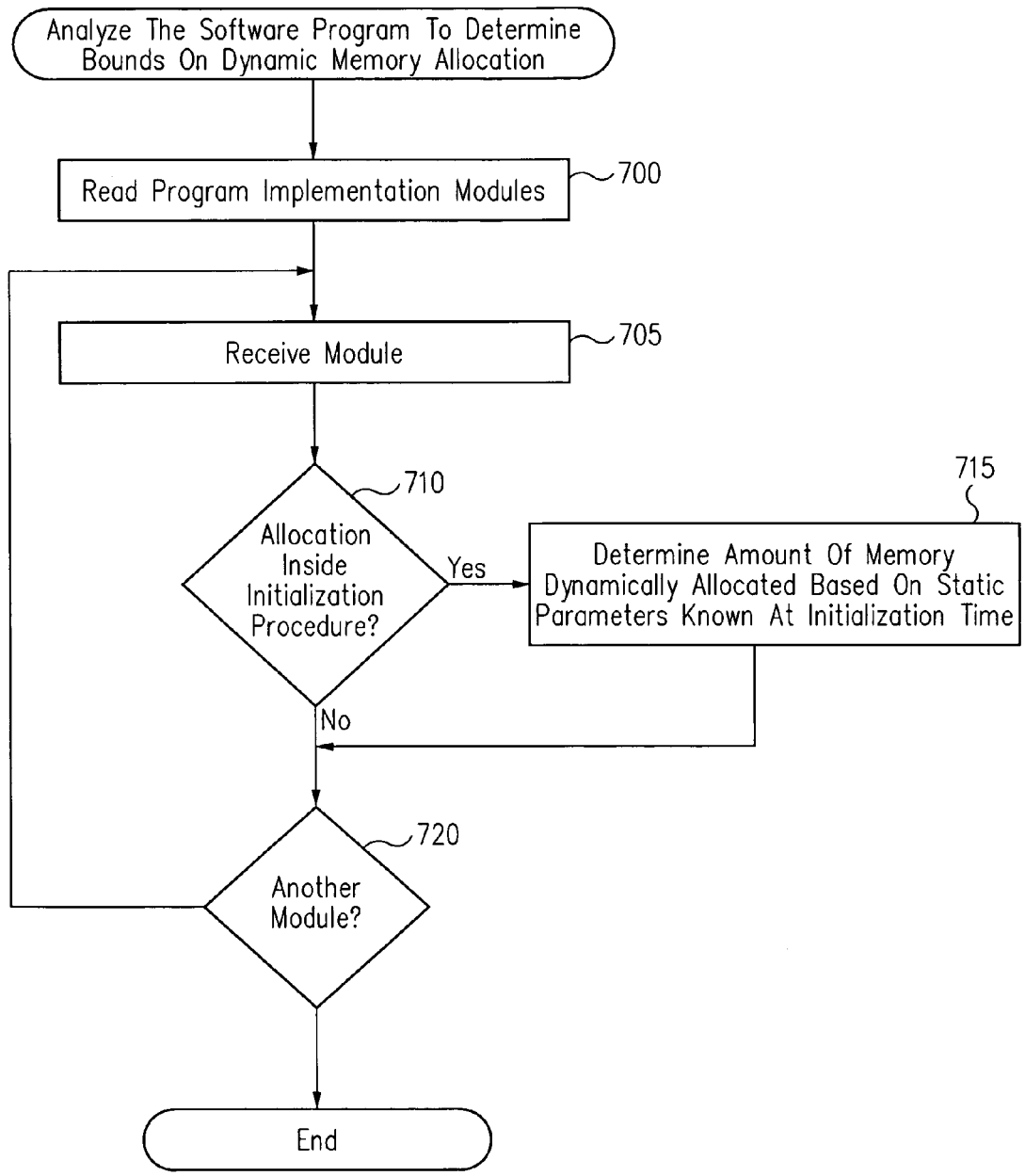
FIG. 7 is a flow diagram that illustrates a method for analyzing software program initialization procedures to determine bounds on dynamic memory allocation in accordance with one embodiment of the present invention.

Turning now to FIG. 7, a flow diagram that illustrates a method for analyzing software program initialization procedures to determine bounds on dynamic memory allocation in accordance with one embodiment of the present invention is presented. At 700, program implementation modules are read. At 705, a module is received. At 710, a determination is made regarding whether a dynamic memory allocation is made inside an initialization procedure. If a dynamic memory allocation is made inside an initialization procedure, at 715 the amount of memory dynamically allocated is determined based upon static parameters known at initialization time. At 720 a determination is made regarding whether another module remains. If another module remains, processing continues at 705. This process continues until all program modules have been analyzed.

Dynamic memory allocations made outside an initialization procedure are potentially unbounded. Thus, the program implementation and the program specifications are analyzed to determine bounds on dynamic memory allocation requests. This analysis includes performing control flow and data flow analysis of the implementation and the specifications to determine bounds on dynamic memory allocation. Analysis of the implementation may utilize data type information to establish an upper bound. The value of this information depends upon the particular data type. For example, if the number of dynamically allocated elements is designated by a 16-bit signed integer variable and if analysis of the implementation reveals no bound on the variable, the upper bound can be set to the maximum value of the data type. In this case, the maximum value of the data type is 32,768, making the allocation essentially unbounded.

Figure 8A:
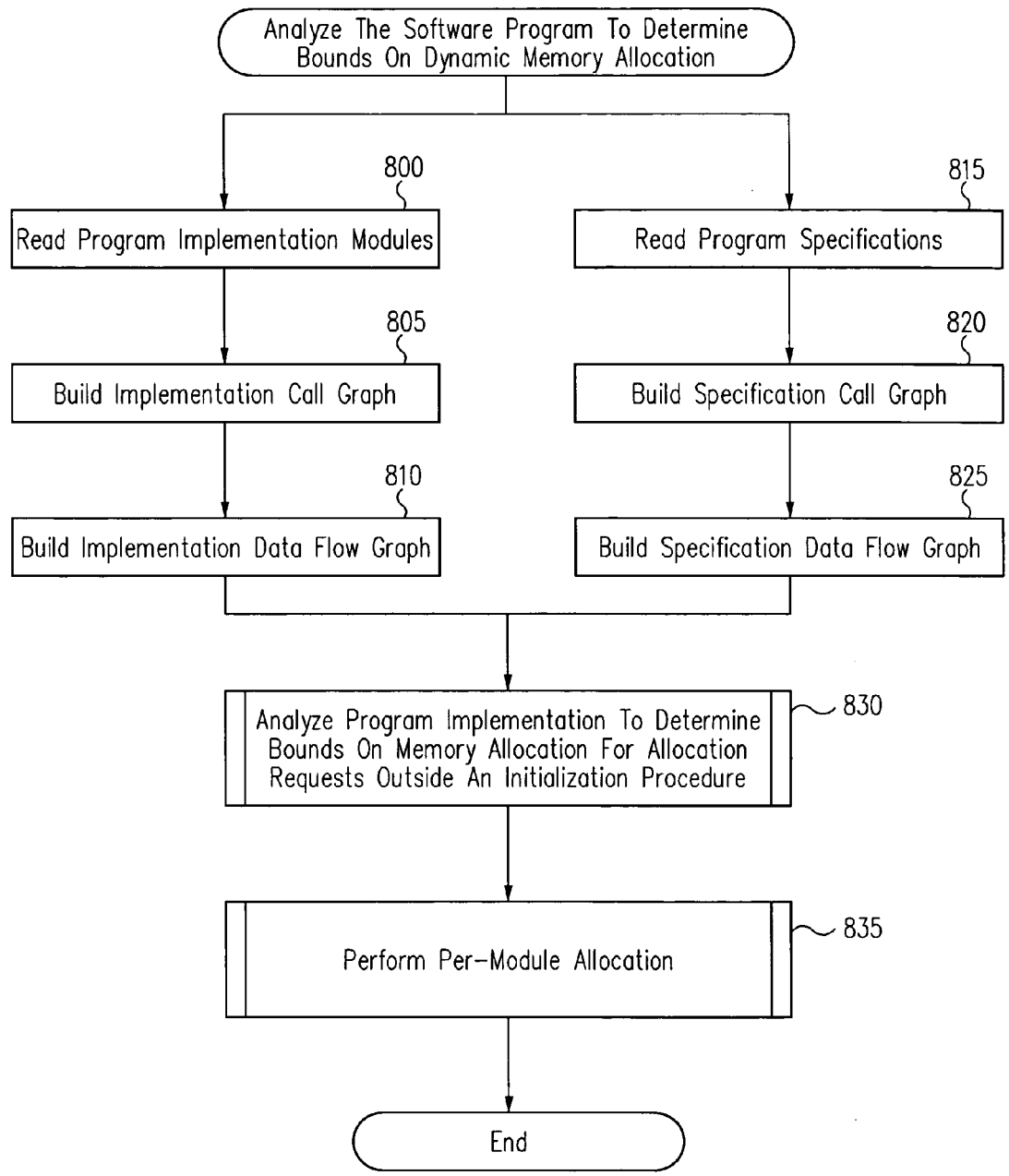
FIG. 8A is a flow diagram that illustrates a method for analyzing a software program to determine a bound on dynamic memory allocation in accordance with one embodiment of the present invention.

Turning now to FIG. 8A, a flow diagram that illustrates a method for analyzing a software program to determine a bound on dynamic memory allocation in accordance with one embodiment of the present invention is presented. At 800, program implementation modules are read. At 805, a call graph based on the implementation modules is built. At 810, a data flow graph based on the implementation modules is built. At 815, program specifications corresponding to the program implementation modules are read. At 820, a call graph based on the specifications is built. At 825, a data flow graph based on the specifications is built. As shown in FIG. 8, processes 800–810 may proceed in parallel with processes 815–825. Alternatively, processes 800–810 may proceed before or after processes 815–825. Once both sets of call graphs and data flow graphs have been built, at 830 the program implementation is analyzed to determine bounds on memory allocation for allocation requests made outside an initialization procedure. At 835, per-module allocation is performed based upon the analysis at reference numeral 830.

Figure 8B:
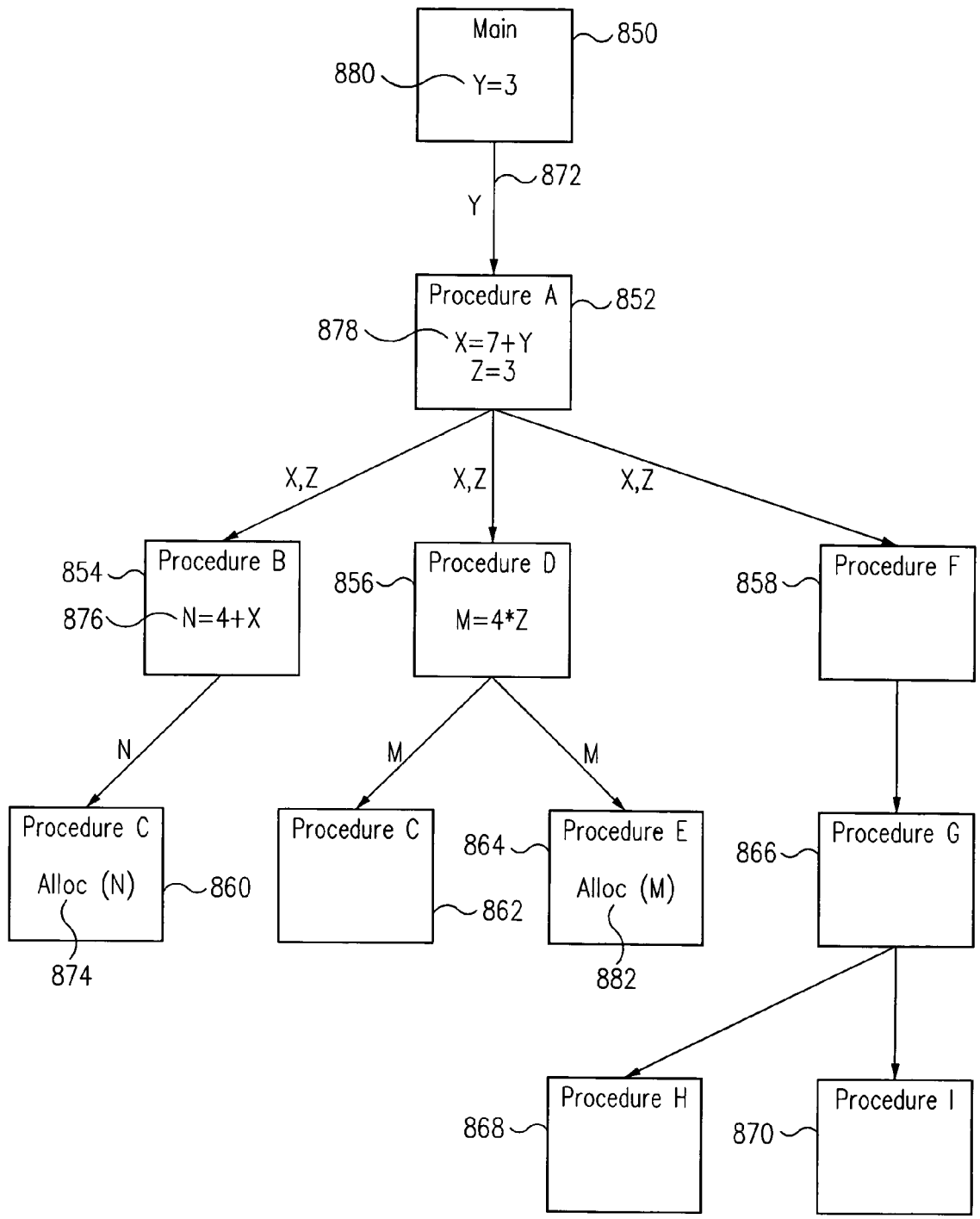
FIG. 8B is a block diagram that illustrates using a call graph and a data flow graph to determine bounds on memory allocation in accordance with one embodiment of the present invention.

Turning now to FIG. 8B, a block diagram that illustrates using a call graph and a data flow graph to determine bounds on memory allocation in accordance with one embodiment of the present invention is presented. Procedures in the call graph are represented by nodes 850–870. A procedure calling relationship is represented by a directed line originating with the calling procedure and terminating with the called procedure. By way of example, directed line 872 indicates procedure Main 850 calls procedure A (852). FIG. 8B also illustrates a data flow graph, where nodes 850–870 represent procedures and the lines between procedures represent the flow of data between procedures. Data may be passed as a parameter in a procedure call. Data may also be implicitly passed from one procedure to another if the data is created in a first procedure and made accessible to a second procedure.

Still referring to FIG. 8B, establishing bounds on memory allocation is illustrated with respect to procedures C (860) and E (864). Procedure C (860) includes a dynamic allocation request 874 for "N" items. Thus, the value of the variable "N" determines the amount of memory required for the allocation. The value of the variable "N" is not set locally in procedure C (860), so the call graph and data flow graph are analyzed to determine a bound on the variable "N". Examination of the call graph indicates procedure B (854) calls procedure C (860). Examination of the data flow graph indicates procedure B (854) provides the variable "N" and its value is four plus the value of variable "X" (876). The value of the variable "X" is not set locally in procedure B (854), so the call graph and data flow graph are analyzed to determine a bound on the variable "X". Examination of the call graph indicates procedure A (852) calls procedure B (854). Examination of the data flow graph indicates procedure A (852) provides the variable "X" and its value is seven plus the value of variable "Y" (878). The value of the variable "Y" is not set locally in procedure A (852), so the call graph and data flow graph are analyzed to determine a bound on the variable "Y". Examination of the call graph indicates procedure Main (850) calls procedure A (852). Examination of the data flow graph indicates procedure Main (850) provides the variable "Y" and its value is three (880). Thus, the maximum size for the variable N is (4+7+3)=14. This establishes a bound on memory allocation 874.

Determining bounds for the variable M used to dynamically allocate memory (882) in procedure E (864) proceeds in a similar manner. Examination of procedures E (864), D (856) and A (852) reveals the maximum value for the variable M is (4*3)=12. This establishes a bound on memory allocation 882.

Figure 9:
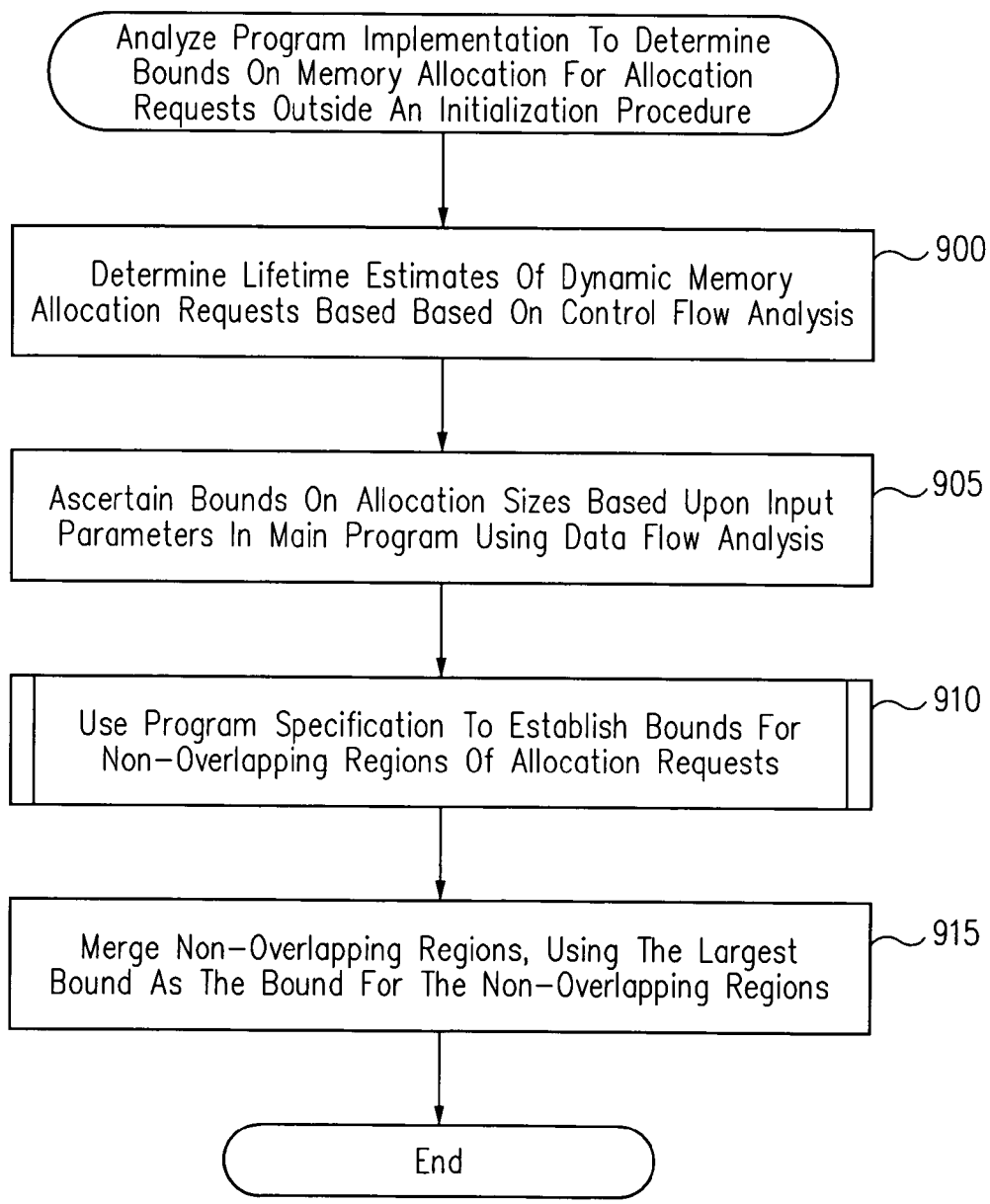
FIG. 9 is a flow diagram that illustrates a method for analyzing a software program to determine bounds on dynamic memory allocation for allocation requests outside an initialization procedure in accordance with one embodiment of the present invention.

Turning now to FIG. 9, a flow diagram that illustrates a method for analyzing a software program to determine bounds on dynamic memory allocation for allocation requests outside an initialization procedure in accordance with one embodiment of the present invention is presented. FIG. 9 provides more detail for reference numeral 830 in FIG. 8. This analysis uses bounds determined from data flow and control flow analysis of the program implementation, in addition to any bounds derived from data flow and control flow analysis of the corresponding specifications. At 905, lifetime estimates of dynamic memory allocation requests are determined based upon program implementation control flow analysis data. The lifetime estimates estimate the duration of use of the resulting memory from each dynamic memory allocation request.

Still referring to FIG. 9, at 905 bounds on allocation sizes are ascertained based upon input parameters in the main program using data flow analysis. If none of the input parameters to the main program constrain the value of a variable used in a dynamic allocation, the dynamic allocation is constrained by the range of permissible values allowed by the value's data type. For example, suppose a Java™ program includes a dynamic memory allocation request for an array (1 . . . N) of integers, where "N" is of type "short integer". A short integer in the Java™ language is a 16-bit signed integer and the maximum possible value is $2^{15}$ (32,768). In this case, if data flow analysis of the program implementation results in a constraint less than the constraint of the data type (32,768), the lesser constraint is used.

A program specification may include limits or bounds on dynamic memory allocation requests. This information may be used to constrain the amount of memory dynamically allocated beyond the constraints obtained by analyzing the program implementation. For example, suppose an implementation declares a variable "X" as an eight-bit signed integer and the implementation also declares an array "Y" of 16-bit integers with array index values ranging from 1 to X. Without further implementation constraints on the variable "X", analysis of the implementation would indicate array "Y" requires 128 ($2^{(8-1)}$) 16-bit words. A program specification may further constrain program values. For example, a specification for the above implementation may specify a maximum value of 10 for variable "X". Thus, ten 16-bit words can be statically allocated for variable "Y", instead of 128.

A program implementation is correct if the bounds derived from the implementation are at least as wide as the program specification. Bounds from the program specification may be more constrained than the corresponding bounds from the program implementation. If bounds from a program specification are less constrained, the specification is improper and the implementation may be erroneous.

According to one embodiment of the present invention, the program specification is separate from the program implementation. According to another embodiment of the present invention, the program specification is embedded within the program implementation. By way of example, the program specification may comprise a collection of program comments interspersed throughout the program implementation. A variable declaration including a dynamic memory allocation in a program implementation may include a constraint delimited by a comment character, where the constraint comprises a part of the program specification constraining the size of the variable.

The above example is presented for illustrative purposes only and is not intended to be limiting in any way. Those of ordinary skill in the art will recognize that other types of dynamic memory allocations may be converted to static memory allocations without departing from the inventive concepts disclosed herein.

Still referring to FIG. 9, at 910 a program specification is used to establish bounds for non-overlapping regions of allocation requests. A non-overlapping region is a collection of memory allocations whose use by multiple requestors within the same program is temporally distinct. In other words, a first region is non-overlapping with respect to a second region if none of the allocation requests corresponding to the first region are made while any of the allocation requests corresponding to the second region are being used. At 915, non-overlapping regions are merged, using the largest bound as the bound for the non-overlapping regions.

Figure 10:
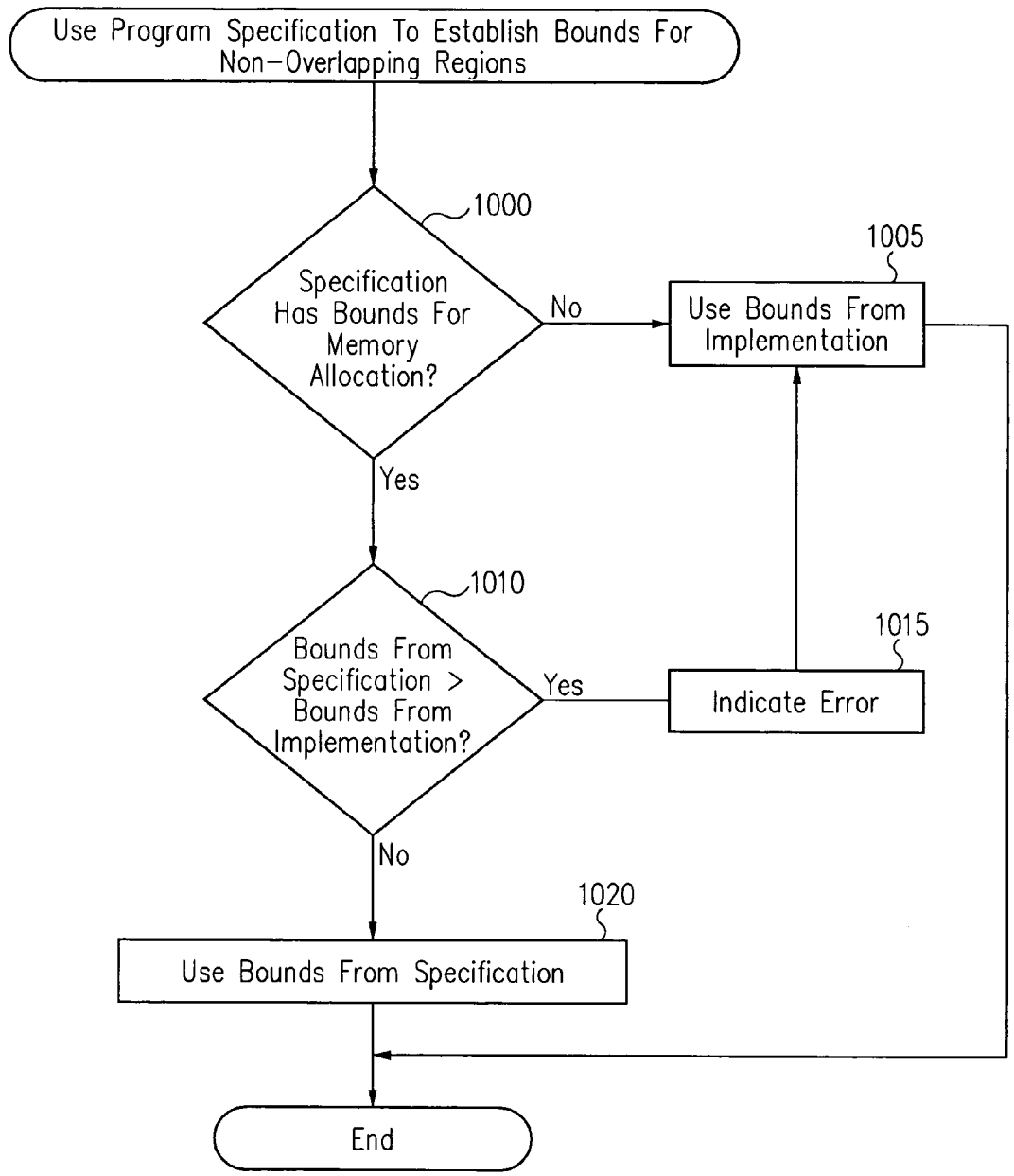
FIG. 10 is a flow diagram that illustrates a method for using a program specification to establish bounds for non-overlapping regions in accordance with one embodiment of the present invention.
Figure 11:
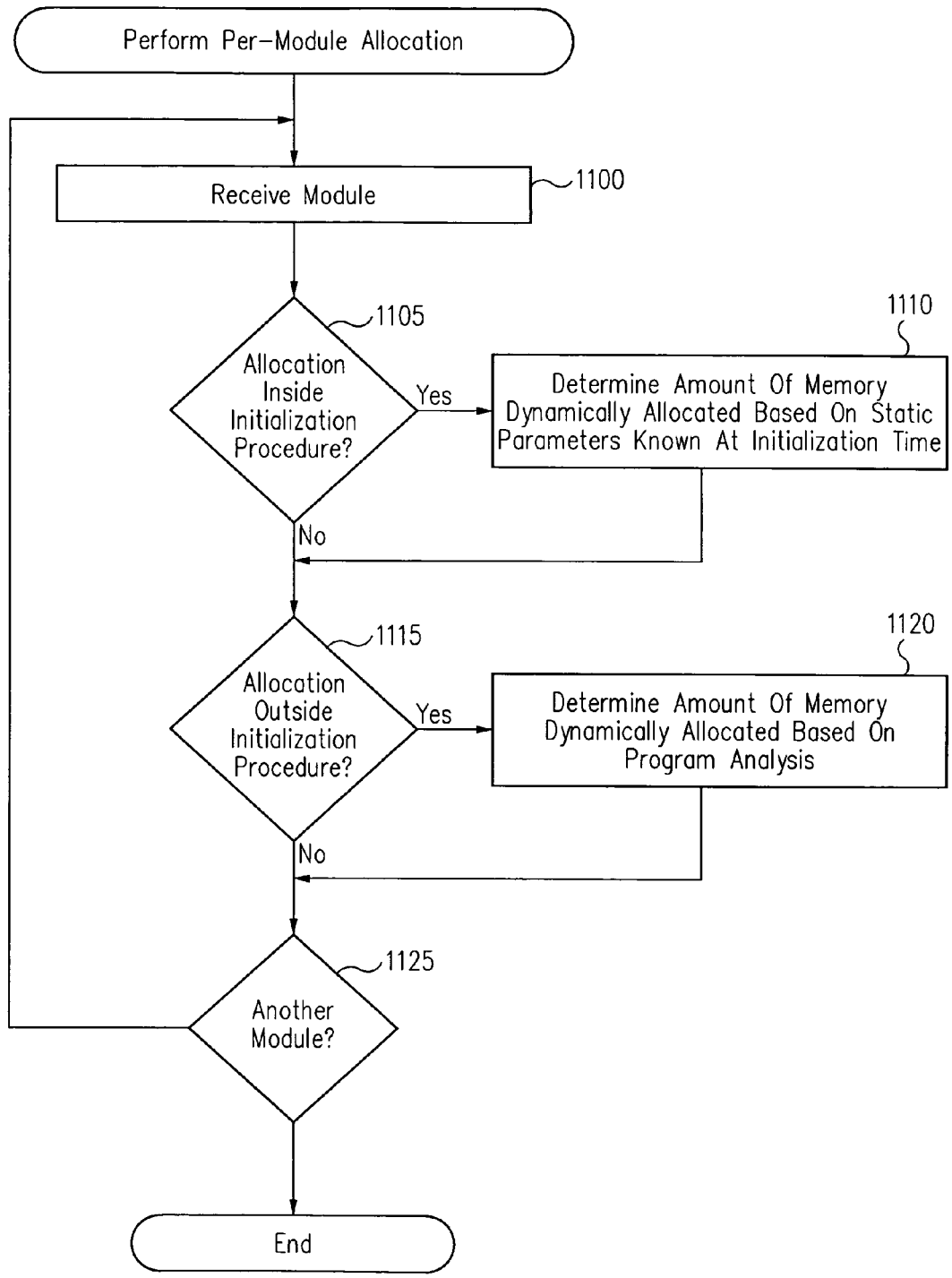
FIG. 11 is a flow diagram that illustrates a method for performing per-module allocation in accordance with one embodiment of the present invention.

Turning now to FIG. 10, a flow diagram that illustrates a method for using a program specification to establish bounds for non-overlapping regions in accordance with one embodiment of the present invention is presented. FIG. 10 provides more detail for reference numeral 910 in FIG. 9. At 1000, a determination is made regarding whether the specification has bounds for dynamic memory allocation made in the implementation. If the specification has no bounds for dynamic memory allocation, at 1005 bounds from the implementation are used to bound the static allocation. If the specification has bounds for dynamic memory allocation, at 1010 a determination is made regarding whether the bounds from the specification are greater than the bounds from the implementation. If the bounds from the implementation are greater than the bounds from the implementation, an error is indicated at 1015 and the bounds from the implementation are used at 1005. Such an indication signifies either that the implementation may have been improperly implemented, or that the specifications are inconsistent. If the bounds from the specification are not greater than the bounds from the implementation, the bounds from the specification are used at 1005.

According to one embodiment of the present invention, a variable is flagged if the bound analysis determines the variable is essentially unbound. The variable may be flagged, by way of example, by inserting an annotation in the source file or by generating an alert message sent to a user.

According to another embodiment of the present invention, if a bound for a variable is determinable from the program implementation but a bound for the same variable is not found in the program specification, the bound determined from the program implementation is inserted into the program specification.

According to another embodiment of the present invention, the bounds analysis and resulting software program modification are repeated until the bound obtained from analyzing the program implementation converges with the maximum bound obtained from the program specification associated with the program implementation.

Turning now to FIG. 16, a block diagram that illustrates an apparatus for deployment of high integrity software using initialization order and calling order constraints in accordance with one embodiment of the present invention is presented. FIG. 16 is similar to FIG. 5, except that the embodiment illustrated in FIG. 16 includes multiple initialization sequences and corresponding calling order constraints. The initialization sequence is determined based upon a conditional variable set by a memory zone manager module 1628. According to one embodiment, the conditional variable is set based on the presence of one or more markers in a persistent mutable memory such as EEPROM 1605 as described in copending U.S. patent application Ser. No. 10/101,290, filed Mar. 18, 2002 in the name of Eduard de Jong, entitled "Enhanced Memory Management for Portable Devices". According to another embodiment, the conditional variable is set via one or more hardware fuses.

Figure 12:
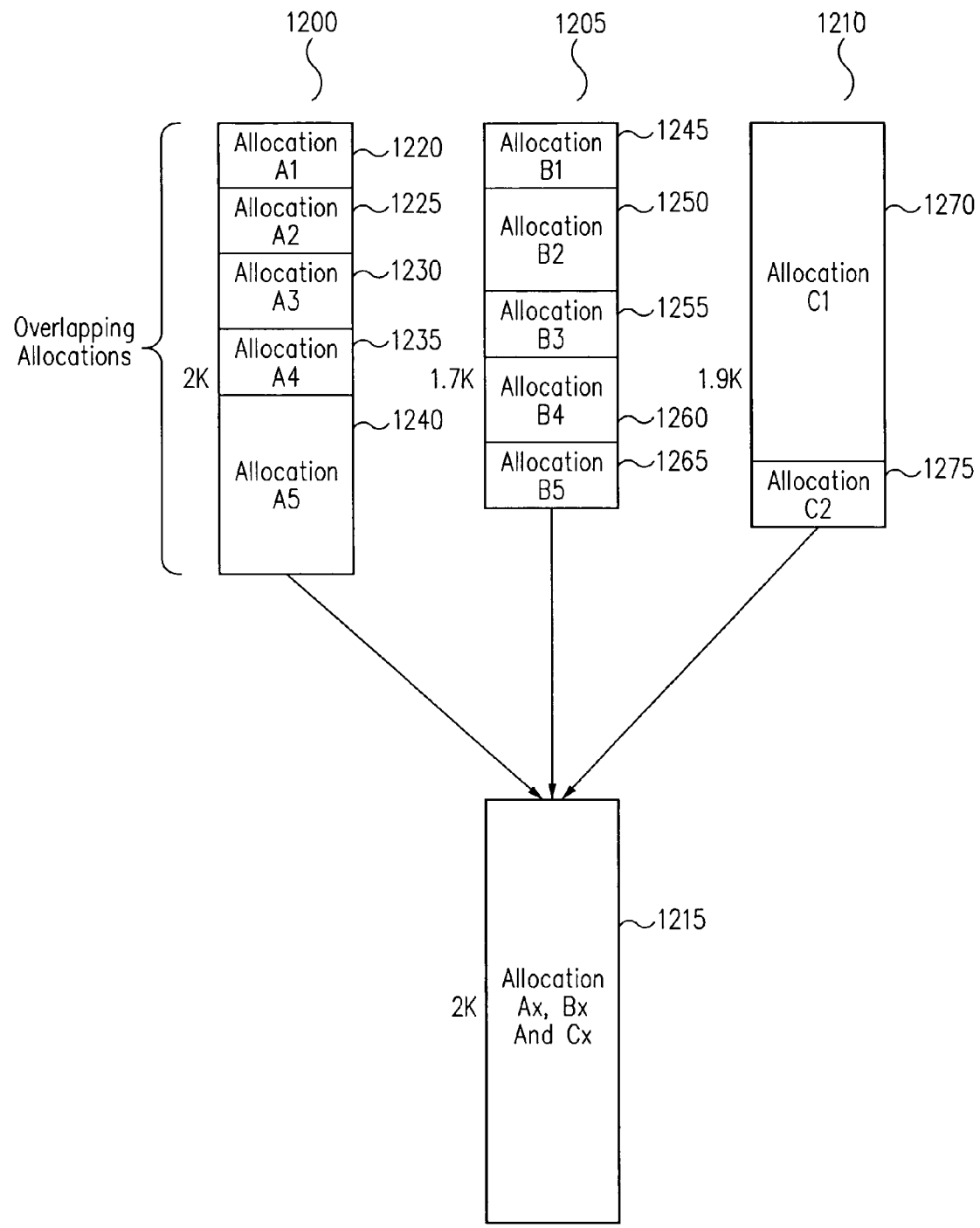
FIG. 12 is a block diagram that illustrates merging non-overlapping allocations in accordance with one embodiment of the present invention.

Turning now to FIG. 12, a block diagram that illustrates merging non-overlapping allocations in accordance with one embodiment of the present invention is presented. FIG. 12 illustrates three sets of dynamic memory allocation requests (1200, 1205, 1210), determined by performing control flow and data flow analysis. Set 1200 includes dynamic memory allocation requests 1220, 1225, 1230, 1235 and 1240, and the total amount of memory requested by set 1200 is 2K. Set 1205 includes dynamic memory allocation requests 1245, 1250, 1255, 1260 and 1265 and the total amount of memory requested by set 1208 is 1.7K. Set 1210 includes dynamic memory allocation requests 1270 and 1275 and the total amount of memory requested by set 1210 is 1.9K. According to embodiments of the present invention, the dynamic memory allocation requests within a set may overlap in time, but memory allocation requests in different sets do not overlap in time. For example, dynamic memory allocation requests 1220, 1225, 1230, 1235 and 1240 may all exist simultaneously, but memory allocation requests A1–A5 (1220–1240) do not exist simultaneously with any of the memory allocation requests B1–B4 (1245–1265) or C1–C2 (1270–1275). Once sets of non-overlapping memory allocations are determined, each set is allocated the same memory space 1215. The amount of memory allocated is based upon the largest amount of memory requested by any of sets. In the present example, set 1200 has the largest total request size (2K), so the amount of memory allocated for the common memory space (1215) is 2K.

According to one embodiment of the present invention, the analyzed program is targeted for execution on a resource-constrained device. Resource-constrained devices are generally considered to be those that are relatively restricted in memory and/or computing power or speed, as compared to typical desktop computers and the like. According to one embodiment of the present invention, the resource-constrained device comprises a smart card. According to another embodiment of the present invention, the smart card comprises a Java Card™ technology-enabled smart card. The invention can be used with other resource-constrained devices including, but not limited to, cellular telephones, boundary scan devices, field programmable devices, personal digital assistants (PDAs) and pagers, as well as other miniature or small-footprint devices. The invention can also be used on non-resource constrained devices.

According to one embodiment of the present invention, a dynamic memory allocation in a software program is annotated to indicate whether the dynamic memory allocation should be modified based on a dynamic memory bounds analysis of the software program. The annotation provides a mechanism by which a programmer can guarantee dynamic allocation for a variable.

Embodiments of the present invention have a number of advantages. Decreasing the amount of dynamic memory allocations increases program predictability and verifiability. Decreasing the amount of dynamic memory allocations also simplifies memory management, resulting in relatively efficient code. Additionally, decoupling the state of the memory allocation from the state of the module that uses the memory allocation simplifies verification. Also, automatic code optimization obviates the need to manually preallocate memory for dynamic allocations, thus simplifying the software development process. Automatic code optimization also liberates programmers from the need to perform manual static allocation of memory for programs targeted to devices having relatively limited memory.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for reducing dynamic memory allocation, comprising:
   designing a software program using a dynamic memory allocation module for allocating memory;
   analyzing said software program to determine a bound on dynamic memory allocation in said software program; and
   modifying said software program based on said analyzing wherein said analyzing and said modifying are performed using a processor, wherein said modifying further comprises modifying said software program to use static memory allocation in lieu of dynamic memory allocation based on said analyzing.

2. The method of claim 1 wherein said modifying further comprises modifying at least one dynamic memory allocation request in said software program based on said analyzing.

3. The method of claim 2 wherein said modifying further comprises rewriting a "size" parameter of a dynamic memory allocation request procedure call to refer to an index into a table of at least one pre-allocated memory block address, a size of said at least one pre-allocated memory block based on said analyzing.

4. The method of claim 2 wherein said modifying further comprises rewriting a dynamic memory allocation request to refer to an address of a pre-allocated memory block.

5. The method of claim 1 wherein said analyzing comprises determining dynamic memory allocation in at least one initialization procedure of a module, said initialization procedure configured to execute prior to execution of any other procedure of the same module.

6. The method of claim 1 wherein said analyzing comprises determining dynamic memory allocation outside an initialization procedure of a module, said initialization procedure configured to execute prior to execution of any other procedure of the same module.

7. The method of claim 6 wherein
   said method further comprises receiving a specification and an implementation corresponding to said software program; and
   said analyzing further comprises:
   analyzing said implementation to determine a first bound on dynamic memory allocation;
   analyzing said specification to determine a second bound on dynamic memory allocation; and
   indicating a bound on said software program, said bound based upon said first bound and said second bound.

8. The method of claim 7 wherein said indicating a bound further comprises indicating said bound comprises said first bound if said second bound is not derivable from said specification.

9. The method of claim 7 wherein said indicating a bound further comprises indicating an error if said second bound is greater than said first bound.

10. The method of claim 7 wherein said indicating a bound further comprises indicating said bound comprises said second bound if said second bound is derivable from said specification.

11. The method of claim 7 wherein said analyzing said implementation further comprises:
   using a call graph of said software program to perform control flow analysis and data flow analysis;
   determining lifetime estimates of dynamic memory allocation requests based on said control flow analysis;
   ascertaining bounds on dynamic memory allocation sizes based upon input parameters in a main module of said software program using said data flow analysis;
   using said specification to establish bounds for at least one non-overlapping region of said dynamic memory allocation requests; and
   merging non-overlapping regions using the largest bound of said at least one non-overlapping region as the bound for said at least one non-overlapping region.

12. The method of claim 11, further comprising indicating an error if said bounds from said specification are greater than said bounds from said implementation.

13. The method of claim 7 wherein said analyzing said implementation further comprises basing said first bound upon data type information of a data type for at least one variable belonging to said data type, said variable used to specify the amount of dynamically allocated memory, said data type information comprising a range of permissible values for each variable belonging to said data type.

14. The method of claim 7 wherein at least part of said specification is embedded within said implementation.

15. The method of claim 7, further comprising repeating said analyzing and said modifying until said first bound and said second bound converge.

16. The method of claim 7 wherein said analyzing said implementation further includes flagging at least one unbound dynamic memory allocation.

17. The method of claim 7, further comprising inserting said first bound in said specification if said first bound is determinable from said implementation and if said second bound is undeterminable from said specification.

18. The method of claim 1 wherein said analyzing is performed by a compiler.

19. The method of claim 1 wherein said modifying is performed automatically by a tool.

20. The method of claim 1 wherein said program is executed on a resource-constrained device.

21. The method of claim 1 wherein said method further comprises annotating said software program to indicate whether a dynamic memory allocation should be modified based on said analyzing.

22. A program storage device readable by a machine, embodying a stored program of instructions executable by the machine to perform a method for reducing dynamic memory allocation, the method comprising:
   analyzing an input software program to determine a bound on dynamic memory allocation in said input software program, said input software program designed using a dynamic memory allocation module for allocating memory; and modifying said input software program based on said analyzing, wherein said modifying further comprises modifying said input software program to use static memory allocation in lieu of dynamic memory allocation based on said analyzing.

23. The program storage device of claim 22 wherein said modifying further comprises modifying at least one dynamic memory allocation request in said input software program based on said analyzing.

24. The program storage device of claim 23 wherein said modifying further comprises rewriting a "size" parameter of a dynamic memory allocation request procedure call to refer to an index into a table of at least one pre-allocated memory block address, a size of said at least one pre-allocated memory block based on said analyzing.

25. The program storage device of claim 23 wherein said modifying further comprises rewriting a dynamic memory allocation request to refer to an address of a pre-allocated memory block.

26. The program storage device of claim 22 wherein said analyzing comprises determining dynamic memory allocation in at least one initialization procedure of a module, said initialization procedure configured to execute prior to execution of any other procedure of the same module.

27. The program storage device of claim 22 wherein said analyzing comprises determining dynamic memory allocation outside an initialization procedure of a module, said initialization procedure configured to execute prior to execution of any other procedure of the same module.

28. The program storage device of claim 27 wherein said method further comprises receiving a specification and an implementation corresponding to said software program; and
said analyzing further comprises:
analyzing said implementation to determine a first bound on dynamic memory allocation;
analyzing said specification to determine a second bound on dynamic memory allocation; and
indicating a bound on said input software program, said bound based upon said first bound and said second bound.

29. The program storage device of claim 28 wherein said indicating a bound further comprises indicating said bound comprises said first bound if said second bound is not derivable from said specification.

30. The program storage device of claim 28 wherein said indicating a bound further comprises indicating an error if said second bound is greater than said first bound.

31. The program storage device of claim 28 wherein said indicating a bound further comprises indicating said bound comprises said second bound if said second bound is derivable from said specification.

32. The program storage device of claim 28 wherein said analyzing said implementation further comprises:
using a call graph of said input software program to perform control flow analysis and data flow analysis;
determining lifetime estimates of dynamic memory allocation requests based on said control flow analysis;
ascertaining bounds on dynamic memory allocation sizes based upon input parameters in a main module of said input software program using said data flow analysis;
using said specification to establish bounds for at least one non-overlapping region of said dynamic memory allocation requests; and
merging non-overlapping regions using the largest bound of said at least one non-overlapping region as the bound for said at least one non-overlapping region.

33. The program storage device of claim 32 wherein said method further comprises indicating an error if said bounds from said specification are greater than said bounds from said implementation.

34. The program storage device of claim 28 wherein said analyzing said implementation further comprises basing said first bound upon data type information of a data type for at least one variable belonging to said data type, said variable used to specify the amount of dynamically allocated memory, said data type information comprising a range of permissible values for each variable belonging to said data type.

35. The program storage device of claim 28, further comprising repeating said analyzing and said modifying until said first bound and said second bound converge.

36. The program storage device of claim 28 wherein said analyzing said implementation further includes flagging at least one unbound dynamic memory allocation.

37. The program storage device of claim 28 wherein said method further comprises inserting said first bound in said specification if said first bound is determinable from said implementation and if said second bound is undeterminable from said specification.

38. The program storage device of claim 22 wherein said method further comprises:
annotating said input software program to indicate which dynamic memory allocations should not be optimized; and
performing said analyzing and said modifying for unannotated dynamic memory allocations in said input software program.

39. An apparatus for reducing dynamic memory allocation, comprising:
means for receiving a software program designed using a dynamic memory allocation module for allocating memory;
means for analyzing said software program to determine a bound on dynamic memory allocation in said software program; and
means for modifying said software program based on said analyzing, said analyzing, wherein said means for modifying further comprises means for modifying said software program to use static memory allocation in lieu of dynamic memory allocation based on said analyzing.

40. The apparatus of claim 39 wherein said modifying further comprises means for modifying at least one dynamic memory allocation request in said software program based on said analyzing.

41. The apparatus of claim 40 wherein said means for modifying further comprises means for rewriting a "size" parameter of a dynamic memory allocation request procedure call to refer to an index into a table of at least one pre-allocated memory block address, a size of said at least one pre-allocated memory block based on said analyzing.

42. The apparatus of claim 40 wherein said means for modifying further comprises means for rewriting a dynamic memory allocation request to refer to an address of a pre-allocated memory block.

43. The apparatus of claim 39 wherein said means for analyzing comprises means for determining dynamic memory allocation in at least one initialization procedure of a module, said initialization procedure configured to execute prior to execution of any other procedure of the same module.

44. The apparatus of claim 39 wherein said means for analyzing comprises means for determining dynamic memory allocation outside an initialization procedure of a module, said initialization procedure configured to execute prior to execution of any other procedure of the same module.

45. The apparatus of claim 44 wherein
said apparatus further comprises means for receiving a specification and an implementation corresponding to said software program; and
said means for analyzing further comprises:
means for analyzing said implementation to determine a first bound on dynamic memory allocation;
means for analyzing said specification to determine a second bound on dynamic memory allocation; and
means for indicating a bound on said software program, said bound based upon said first bound and said second bound.

46. The apparatus of claim 45 wherein said means for indicating a bound further comprises means for indicating said bound comprises said first bound if said second bound is not derivable from said specification.

47. The apparatus of claim 45 wherein said means for indicating a bound further comprises means for indicating an error if said second bound is greater than said first bound.

48. The apparatus of claim 45 wherein said means for indicating a bound further comprises means for indicating said bound comprises said second bound if said second bound is derivable from said specification.

49. The apparatus of claim 45 wherein said means for analyzing said implementation further comprises:
means for using a call graph of said software program to perform control flow analysis and data flow analysis;
means for determining lifetime estimates of dynamic memory allocation requests based on said control flow analysis;
means for ascertaining bounds on dynamic memory allocation sizes based upon input parameters in a main module of said software program using said data flow analysis;
means for using said specification to establish bounds for at least one non-overlapping region of said dynamic memory allocation requests; and
means for merging non-overlapping regions using the largest bound of said at least one non-overlapping region as the bound for said at least one non-overlapping region.

50. The apparatus of claim 49, further comprising means for indicating an error if said bounds from said specification are greater than said bounds from said implementation.

51. The apparatus of claim 45 wherein said means for analyzing said implementation further comprises means for basing said first bound upon data type information of a data type for at least one variable belonging to said data type, said variable used to specify the amount of dynamically allocated memory, said data type information comprising a range of permissible values for each variable belonging to said data type.

52. The apparatus of claim 45, further comprising means for repeating said analyzing and said modifying until said first bound and said second bound converge.

53. The apparatus of claim 45 wherein said means for analyzing said implementation further includes means for flagging at least one unbound dynamic memory allocation.

54. The apparatus of claim 45, further comprising means for inserting said first bound in said specification if said first bound is determinable from said implementation and if said second bound is undeterminable from said program specification.

55. The apparatus of claim 39 wherein said means for analyzing comprises a compiler.

56. The apparatus of claim 39 wherein said means for modifying comprises a software tool.

57. The apparatus of claim 39 wherein said apparatus further comprises means for annotating said software program to indicate whether a dynamic memory allocation should be modified based on said analyzing.

58. An apparatus for reducing dynamic memory allocation, comprising:
a dynamic memory tool configured to receive a program specification for a software program and a program implementation for said software program, said program specification comprising at least one constraint on said program implementation, said tool further configured to analyze said program implementation and said program specification to determine a bound on dynamic memory allocation in said program implementation, said tool further configured to modify said program implementation based on said analyzing, wherein said modifying further comprises modifying said program implementation to use static memory allocation in lieu of dynamic memory allocation based on said analyzing.

59. An apparatus comprising:
a processor; and
a memory coupled to said processor, said memory comprising a program, said program comprising a plurality of procedures, each of said procedures comprising at least one executable instruction, said program having been modified based on a dynamic memory bounds analysis of a program implementation associated with said program and a program specification associated with said program, wherein said modification further comprises modifying said program to use static memory allocation in lieu of dynamic memory allocation based on said analysis.

60. The apparatus of claim 59 wherein said apparatus comprises a smart card.

61. The apparatus of claim 60 wherein said smart card comprises a Java Card™ technology-enabled smart card.

* * * * *